April 17, 1945.  G. H. WILLIAMS  2,373,934
STOP MECHANISM FOR MACHINE TOOLS
Filed Sept. 4, 1943  2 Sheets-Sheet 2

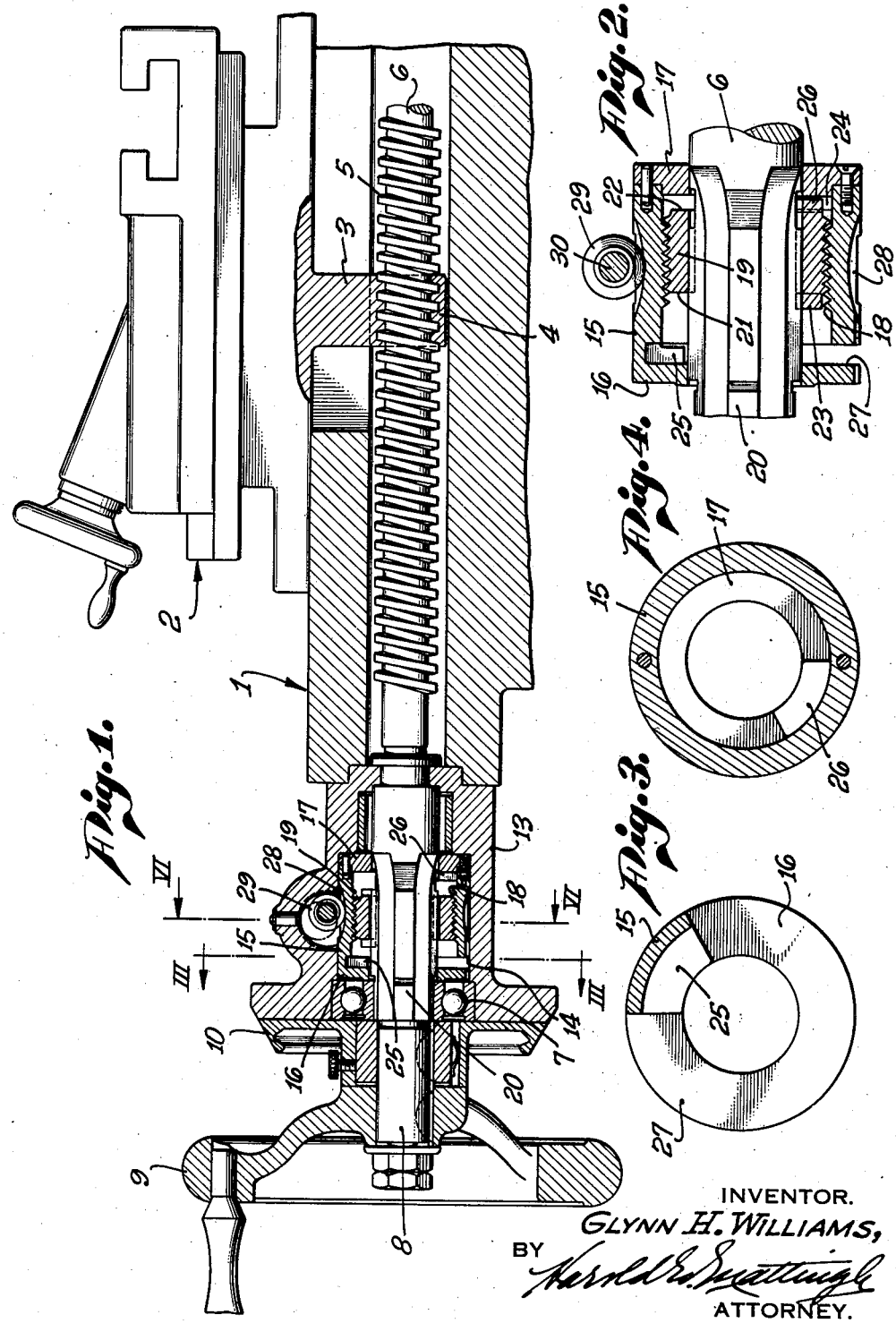

GLYNN H. WILLIAMS,
INVENTOR.

BY
ATTORNEY.

Patented Apr. 17, 1945

2,373,934

UNITED STATES PATENT OFFICE 2,373,934

STOP MECHANISM FOR MACHINE TOOLS

Glynn H. Williams, Huntington Park, Calif., assignor to Axelson Manufacturing Co., Los Angeles, Calif., a corporation of California Application September 4, 1943, Serial No. 501,269

9 Claims. (Cl. 82—24)

My invention relates to a machine tool and has particular reference to a stop device for carriage or tool feeding mechanisms which finds particular utility when used as a cross feed stop for an engine lathe.

It is common practice in the machine tool art to employ stops of one character or another on carriage or tool feeding mechanisms for the purpose of permitting the carriage or tool to be fed along the guiding ways to a particular point and to permit this operation to be repeated with accuracy as many times as are desired, such stops finding particular utility in connection with quantity production problems.

Prior to my invention the conventional form of stop consisted merely of a clamp member or set screw device which was adapted to be clamped or otherwise secured to the guiding ways in the path of the carriage or tool to arrest motion of the carriage or tool at the desired point. Such stops are not entirely satisfactory because they are difficult to set with sufficient rigidity to prevent slipping and a consequent loss in accuracy in the parts produced by the machine and, second, because of the difficulty involved in setting such stops with the precision required.

In many machining operations as, for example, a conventional turning operation on an engine lathe, it is necessary that a stop such as a cross feed stop be set to within an accuracy of plus or minus one or two $1/1000$ of an inch and not infrequently with a tolerance as small as $5/10,000$ of an inch. This is a difficult and time consuming operation with conventional stop mechanisms requiring the stop to be preliminarily set, a test run to be made and the stop to be adjusted and repeated tests and adjustments to be made until the stop is finally located in the desired position.

It is, therefore an object of my invention to overcome the above noted disadvantages by providing a stop device for carriage or tool feeding mechanisms of machine tools which may be set at a desired location by moving the tool or carriage to that location and then moving a stop setting member to an operative position.

It is also an object of my invention to provide a stop device of the character set forth in the preceding paragraph which includes a floating stop which travels with the element to be stopped, together with a means for locking the stop at will against such travel.

It is additionally an object of my invention to provide a stop device of the character set forth in the preceding paragraphs which includes also a means for making micrometer adjustments to the stop location after the stop is set and without releasing the stop.

It is a still further object of my invention to provide a stop device of the character hereinbefore referred to in which the micrometer adjusting device is operable without interfering with the accuracy of indication given by the indicating dials of the carriage or tool feeding mechanism.

It is an additional object of my invention to provide a stop device of the character set forth in the preceding paragraphs which includes also a means for preventing the setting of the stop in the absence of a deliberate, intended attempt to do so.

Other objects and advantages of my invention will be apparent from a study of the following specification, read in connection with the accompanying drawings, wherein:

Fig. 1 is a longitudinal sectional view of the cross feed mechanism of a conventional engine lathe illustrating the preferred embodiment of the stop device of my invention;

Fig. 2 comprises an enlarged view of the stop device included in Fig. 1 and illustrating the stop in its engaged or tool arresting position;

Fig. 3 is a cross sectional view taken substantially along the line III—III of Fig. 1 showing details of construction of a stop housing member;

Fig. 4 is a view similar to Fig. 3 but showing the details of construction of the opposite end of the stop housing member;

Figure 5:
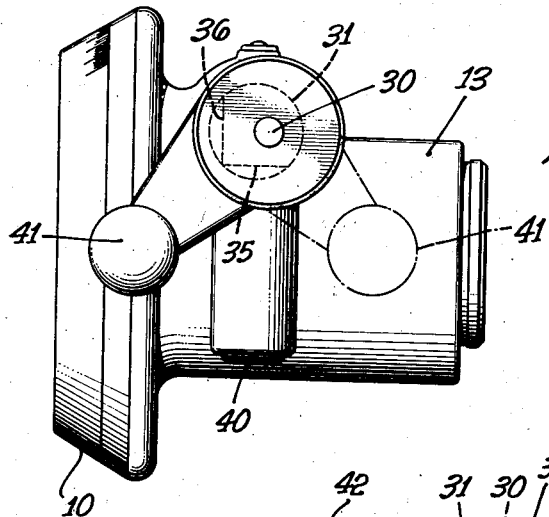
Fig. 5 is a side elevational view of the housing for the stop device showing the control member used to set and release the stop.

Referring to the drawings, I have illustrated in Fig. 1 a conventional carriage or tool feeding mechanism, the particular construction which is illustrated in Fig. 1 comprising the cross feed for a conventional engine lathe. This construction is built into the lathe carriage, the pertinent portion of which is indicated generally by the reference character 1 in Fig. 1.

The carriage 1 defines guiding ways upon which is mounted a compound rest 2. The rest 2 may include a tailpiece 3 which defines a travelling nut portion 4 threadedly engaging a threaded portion 5 of a cross feed screw 6. The feed screw 6 is suitably journaled as, for example, at the outboard end (not shown) and as at 7 and is extended toward the operating side of the lathe as indicated at 8 to receive a handwheel 9 and indicating dial 10, by means of which latter element the location of the carriage relative to the turning axis of the lathe is indicated.

According to the present invention, the lathe carriage 1 is provided with an extension or case portion 13 within which the bearing 7 is mounted and which is longitudinally bored as shown at 14 to receive a rotatable stop housing 15. The stop housing 15 comprises a cylindrical member which is journaled for rotation coaxially with the cross feed screw 6 within the bore 14. The housing 15 includes end closure portions 16 and 17 and is screw threaded interiorly as indicated at 18. Engaged with the screw threads 18 is a similarly male threaded stop element 19, this latter element being bored to encircle the feed screw 6 and interiorly splined to be drivably and slidably engaged with the cross feed screws 6 through the medium of splines 20 formed on the exterior of the screw 6.

The stop member 19 is characterized by front and rear radial faces 21 and 22 from each of which protrudes axially extending lug members 23 and 24 each preferably formed integrally with the stop member 19. Similar radially extending lugs 25 and 26 are formed on the closure members 16 and 17 of the rotatable housing 15, the lug 25 being preferably formed as by milling a radial slot 27 in one end of the housing 15 disposed to cut away the inner portion of the closure 16, the radial slot 27 having an angular scope of approximately 300° to leave an axially protruding portion which constitutes the stop lug 25. This construction is illustrated in Figs. 3 and 4.

With this construction rotation of the cross feed screw 6 will result in rotation of the stop member 19. If, during this rotation, the stop housing 15 is not rotated, the stop member 19 will be moved axially along the splines 20 due to the threaded engagement at 18 between the stop element 19 and the stop housing 15. If, on the other hand, the stop housing 15 is allowed to rotate, the stop element 19 will remain stationary as regards axial movement and the cross feed screw 6 may be rotated to any desired extent.

By holding the stop housing 15 against rotation, the stop member 19 may be caused to rotate within the stop member 15 in response to rotation of the hand-wheel 9 and thereby be moved axially within the housing 15. This axial movement may be continued until the element 19 has moved to such a position that continued rotation of the cross feed screw 6 will bring the side surfaces of one of the lugs 23 or 24 into engagement with a side surface of the stop members 25 or 26. When this condition obtains, the cross feed screw 6 will be restrained against further movement.

In order to permit the stop housing 15 to be held against rotation or released for free rotation as desired, I form on the outer periphery thereof worm gear teeth 28 which are adapted to be engaged by a worm 29. The worm 29 is secured to a transversely extending shaft 30 which is in turn journaled for rotation within a sleeve 31. The sleeve 31 is journaled for angular movement as by extending the same into a counterbore 32 formed in the housing 13 and held against axial movement as by providing a threaded engagement between a reduced diameter portion 33 thereof and a threaded bore 34 constituting an extension of the counterbore 32. The threaded engagement 33—34 is preferably made a close but free fit so that the sleeve 31 may be held against unintended axial movement but mounted for free angular movement.

Figure 6:
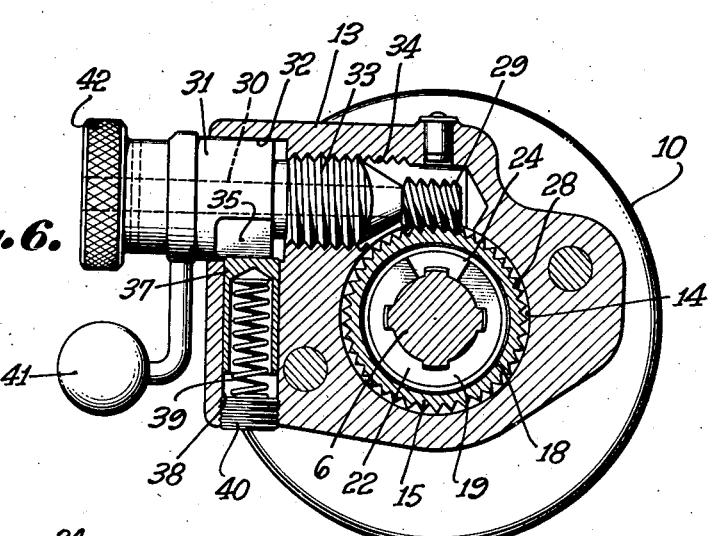
Fig. 6 is a cross sectional view taken substantially along the line VI—VI of Fig. 1 and illustrating the details of construction of the stop device, Fig. 6 showing the stop in its engaged or set position.
Figure 7:
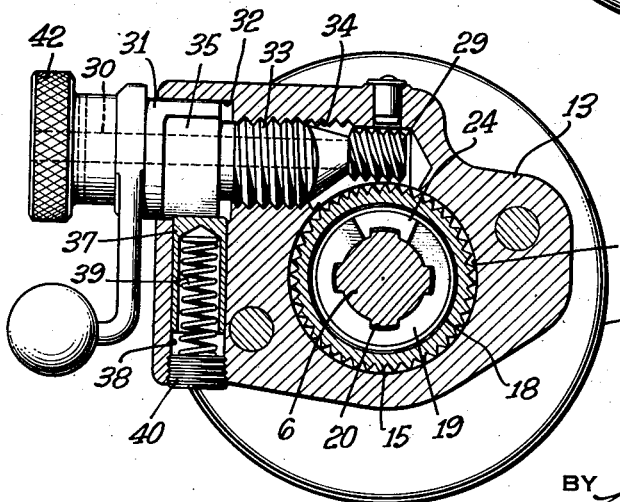
Fig. 7 is a view similar to Fig. 6 but illustrating the positions of the parts when the control device is moved to disengage or release the stop.

The axis of rotation of the sleeve 31 is offset or eccentrically disposed with respect to the shaft 30 so that as the sleeve 31 is moved through an angle of approximately 90°, the worm 29 will be moved from a position such as that illustrated in Fig. 6 in which the worm 29 engages the worm gear teeth 28 to a released position such as that illustrated in Fig. 7 in which the worm 29 is disposed a sufficient distance away from the housing 15 as to permit the same to be freely rotated.

In order to insure that the sleeve 31 will ordinarily be positioned in either of the two positions illustrated in Figs. 6 and 7 and not in an intermediate position, portions of the sleeve 31 are cut away to define plane faces 35 and 36 disposed at right angles to each other and positioned to be engaged by a spring pressed element 37 mounted for slidable movement in a bore 38 and urged upwardly by a compression spring 39 confined within the bore 38 as by means of a screw plug 40. With this arrangement the element 37 must be moved downwardly against the force of the spring 39 in order to move the sleeve 31 between the two positions illustrated in Figs. 6 and 7 and will thus be resiliently held against movement away from these two positions. To facilitate movement of the sleeve 31 between the two described positions, a downwardly and outwardly extending control handle 41 is preferably provided.

The shaft 30 is preferably extended through the sleeve 31 to receive upon its outermost end an adjusting knob 42 by means of which the worm 29 may be rotated when in the engaged position illustrated in Fig. 6. An angular shifting of the knob 42 will thus result in a very slight angular movement of the housing 15 and an equal shifting of the location of the stops 25 and 26, thus permitting extremely accurate and fine adjustments to be made to the position of the stops.

The operation of the device may perhaps be best understood from a description of its use as applied to a particular problem. If a lathe operator decides to so set the stop on the cross feed screw 6 as to prevent inward movement of the compound rest 2 beyond a predetermined position as indicated by the dial 10, he first moves the handwheel 9 in a direction to retract the compound rest 2 or move the same outwardly. This movement is continued for an amount necessary to take the slack out of the stop mechanism and bring the stop 23 into engagement with the stop lug 25 and rotate the stop housing 15, this operation being performed with the stop control member 41 in the position illustrated in Fig. 7 and illustrated in Fig. 5 by dotted lines.

With the parts proportioned as shown in the drawings, no more than five turns of the handwheel 9 will be required to so position the parts. Thereafter the handwheel 9 is turned in the opposite direction to move the compound rest 2 inwards until the rest has been moved to the position as indicated by the dial 10 where it is desired to fix the stop so as to prevent further inward movement. The control handle 41 is then moved to the stop engaging position illustrated in Fig. 6 and by solid lines in Fig. 5.

During the movement of the handwheel to the desired position, the stop member 19 has been rotated within the stop housing 15 to bring the stop 24 against the lug 26. When the control member 41 is moved to stop engaging position, the housing 15 is held against rotation, and further rotation of the cross feed screw 6 is prevented by reason of the engagement of the stop 24 with the lug 26.

In the form of the device shown, the handwheel 9 may be rotated in the opposite or retracting direction for five turns, such an operation resulting in rotation of the stop member 19 within the stop housing 15 and its axial movement within the housing resulting from the threaded engagement 18. Five turns on the cross feed screw 6 will retract the stop member 19 to a point where the stop 23 engages the lug 25. Upon reverse rotation of the handwheel 9 the stop member 19 will again be fed forwardly as it is rotated within the stop housing 15, this rotation of the stop member 19 and the cross feed screw 6 being arrested when the stop 24 again engages the lug 26.

In the event it is found that the stop has not been set with the desired precision, the position of the same may be adjusted by use of the adjusting knob 42. Rotation of this knob will rotate the stop housing 15 and shift the position of the lug 26 to permit a slightly greater or lesser amount of movement of the handwheel 9, depending upon the direction in which the adjustment is made.

In the event it is desired to so locate the stop as to arrest retracting movement of the compound rest 2 at a predetermined location as, for example, in interior boring operations, the procedure above described is followed except that the direction of rotation of the handwheel 9 is reversed during the stop setting operation. When so set the device will operate to prevent retracting movement of the compound rest 2 beyond a predetermined point because of the engagement of the stop 23 with the lug 25. At the same time inward movement from the stop position an amount corresponding to five turns of the handwheel 9 will be permitted.

It will be noted that the teeth of the worm gear 28 and worm 29 are sharper than conventional gear teeth to facilitate the ready meshing of the worm and worm gear as they are engaged.

From the foregoing it will be observed that I have provided a stop device for carriage or tool feeding mechanisms which may be readily and rapidly set at any desired location and with any desired accuracy.

It will be further noted that adjustments in the location of the stop may be readily made by means of the adjusting knob 42 and that such adjustments do not change the validity of the position indications given by the cross feed dial 10.

In the form shown, five turns of the handwheel 9 between inward and outward stops is permitted. This distance may, of course, be increased or decreased as design considerations indicate to be desirable.

It will also be noted that when the stop control member is in the disengaged position, the entire stop mechanism floats within the housing and rotates with the cross feed screw 6 so as to in no way hamper movement of the compound rest 2, the latter being permitted the same full free travel range as is found on machines not employing the stop mechanism of my invention.

While I have shown and described the preferred embodiment of my invention, I do not desire to be limited to any of the details of construction shown or described herein, except as defined in the appended claims.

I claim:

1. In a stop device for a machine tool including a carriage having a housing enclosing a rotatable screw for moving said carriage, the combination of: a movable stop member engaged with said screw means to be rotated therewith; a stationary stop member disposed in a position to be engaged by said movable stop member and arrest rotation of said screw, said stationary stop member being mounted in said housing for rotation with said movable stop member; and means for selectively releasing and holding said stationary stop member against rotation.

2. In a stop device for a machine tool including a carriage and a rotatable screw for moving said carriage, the combination of: a stop member rotatable with said rotatable screw; a stop housing mounted for rotation with said stop member and including a portion engageable by said stop member; control means operable to hold said stop housing against rotation; and adjustment means associated with said control means and operable in said stop engaging position of said control means to shift the position of said stop housing.

3. In a stop device for a machine tool including a carriage and a rotatable screw for moving said carriage, the combination of: a movable stop member drivably engaged with said screw; a stationary stop member mounted for movement to any desired position corresponding to a selected position of said carriage; control means for selectively releasing and locking said stationary stop member against movement; and adjustment means associated with said control means and operable to shift the position of said stationary stop member without releasing the same.

4. In a stop device for a machine tool including a carriage, a rotatable screw for moving said carriage and a dial on said screw for indicating the location of said carriage, the combination of: a movable stop member drivably engaged with said screw to be rotated therewith; a stationary stop member disposed in a position to be engaged by said movable stop member and arrest movement of said screw, said stationary stop member being mounted for movement to any desired position corresponding to a selected position of said carriage as indicated by said dial; control means operable to selectively release and hold said stationary stop member against movement; and adjustment means associated with said control means and operable in the stop holding position of said control means to shift the location of said stationary stop means, said adjustment being operable without affecting the validity of the carriage position indication given by said dial.

5. In a stop device for a machine tool including a carriage and a rotatable screw for moving said carriage, the combination of: a stop member rotatable with said rotatable screw; a stop housing mounted for rotation with said stop member and including a portion engageable by said stop member, said stop housing having worm gear teeth formed on the periphery thereof; and a worm wheel mounted for rotation about an axis eccentrically disposed with respect to said worm wheel, whereby said worm wheel may be rotated to move the same from a position spaced from said worm gear teeth to a position engaging said worm gear teeth and holding said stop housing against rotation.

6. In a stop device for a machine tool including a carriage and a rotatable screw for moving said carriage, the combination of: a cylindrical member mounted on said screw coaxially therewith for rotation with said screw and for sliding movement therealong, said cylindrical member having external screw threads formed on the exterior thereof and disposed coaxially with said screw; a stop housing mounted for independent rotation coaxially with said screw, said stop housing being internally screw threaded to receive said screw threads on said cylindrical member; means on said cylindrical member defining an axially extending stop lug; means on said stop housing defining an axially extending stop lug disposed in a position to be engaged by the stop lug on said cylindrical member; and means for selectively releasing and holding said stop housing against rotation.

7. In a stop device for a machine tool including a carriage and a rotatable screw for moving said carriage, the combination of: a cylindrical member mounted on said screw coaxially therewith for rotation with said screw and for sliding movement therealong, said cylindrical member having external screw threads formed on the exterior thereof and disposed coaxially with said screw; a stop housing mounted for independent rotation coaxially with said screw, said stop housing being internally screw threaded to receive said screw threads on said cylindrical member; means on said cylindrical member defining an axially extending stop lug; means on said stop housing defining an axially extending stop lug disposed in a position to be engaged by the stop lug on said cylindrical member, said stop housing having worm gear teeth formed on the exterior periphery thereof; a worm mounted for rotation about an axis eccentrically disposed with respect to said worm, whereby rotation of said worm about said axis moves said worm from a position spaced from said stop housing to a position engaging said worm with said worm gear teeth to hold said stop housing against rotation; and control means for rotating said worm about said axis.

8. In a stop device for a machine tool including a carriage and a rotatable screw for moving said carriage, the combination of: a cylindrical member mounted on said screw coaxially therewith for rotation with said screw and for sliding movement therealong, said cylindrical member having external screw threads formed on the exterior thereof and disposed coaxially with said screw; a stop housing mounted for independent rotation coaxially with said screw, said stop housing being internally screw threaded to receive said screw threads on said cylindrical member; means on said cylindrical member defining an axially extending stop lug; means on said stop housing defining an axially extending stop lug disposed in a position to be engaged by the stop lug on said cylindrical member, said stop housing having worm gear teeth formed on the exterior periphery thereof; a worm mounted for rotation about an axis eccentrically disposed with respect to said worm, whereby rotation of said worm about said axis moves said worm from a position spaced from said stop housing to a position engaging said worm with said worm gear teeth to hold said stop housing against rotation; control means for rotating said worm about said axis; means mounting said worm about a second axis disposed concentrically with respect to said worm; and means for rotating said worm about said second axis, whereby said stop housing may be angularly shifted to angularly shift the location of the point of engagement of said stop lugs.

9. In a stop device for a machine tool including a carriage and a rotatable screw for moving said carriage, the combination of: a cylindrical member mounted on said screw coaxially therewith for rotation with said screw and for sliding movement therealong, said cylindrical member having external screw threads formed on the exterior thereof and disposed coaxially with said screw; a stop housing mounted for independent rotation coaxially with said screw, said stop housing being internally screw threaded to receive said screw threads on said cylindrical member; means on said cylindrical member defining an axially extending stop lug; means on said stop housing defining an axially extending stop lug disposed in a position to be engaged by the stop lug on said cylindrical member, said stop housing having worm gear teeth formed on the exterior periphery thereof; a worm mounted for rotation about an axis eccentrically disposed with respect to said worm, whereby rotation of said worm about said axis moves said worm from a position spaced from said stop housing to a position engaging said worm with said worm gear teeth to hold said stop housing against rotation; control means for rotating said worm about said axis; and spring urged detent means for yieldably holding said control means in said releasing and holding positions.

GLYNN H. WILLIAMS.